(12) United States Patent
Fujiki et al.

(10) Patent No.: US 9,105,926 B2
(45) Date of Patent: Aug. 11, 2015

(54) POSITIVE ELECTRODE ACTIVE MATERIAL, POSITIVE ELECTRODE, AND NONAQUEOUS ELECTROLYTE CELL

(75) Inventors: Satoshi Fujiki, Fukushima (JP); Yosuke Hosoya, Fukushima (JP); Koji Morita, Fukushima (JP)

(73) Assignee: Sony Corporation, Tokyo (JP)

( * ) Notice: Subject to any disclaimer, the term of this patent is extended or adjusted under 35 U.S.C. 154(b) by 784 days.

(21) Appl. No.: 12/835,501

(22) Filed: Jul. 13, 2010

(65) Prior Publication Data

US 2011/0020708 A1 Jan. 27, 2011

(30) Foreign Application Priority Data

Jul. 24, 2009 (JP) ................. P2009-172968

(51) Int. Cl.
*H01M 4/485* (2010.01)
*H01M 4/36* (2006.01)
*H01M 10/0525* (2010.01)
*H01M 4/02* (2006.01)

(52) U.S. Cl.
CPC .............. *H01M 4/485* (2013.01); *H01M 4/366* (2013.01); *H01M 10/0525* (2013.01); *H01M 2004/028* (2013.01); *Y02E 60/122* (2013.01)

(58) Field of Classification Search
USPC .............. 429/231.95, 231.9, 218.1, 223, 224, 429/231.6, 231.5; 252/182.1; 427/123, 58, 427/126.1
See application file for complete search history.

(56) References Cited

U.S. PATENT DOCUMENTS

| | | | |
|---|---|---|---|
| 6,372,385 B1 | 4/2002 | Kweon et al. | |
| 6,653,021 B2 | 11/2003 | Kweon et al. | |
| 6,730,435 B1 | 5/2004 | Nakane et al. | |
| 6,783,890 B2 | 8/2004 | Kweon et al. | |
| 6,984,469 B2 | 1/2006 | Kweon et al. | |
| 2002/0076613 A1 | 6/2002 | Lee et al. | |
| 2009/0087731 A1* | 4/2009 | Fukui et al. | 429/164 |
| 2010/0264363 A1* | 10/2010 | Paulsen et al. | 252/182.1 |

FOREIGN PATENT DOCUMENTS

| | | | | |
|---|---|---|---|---|
| JP | HEI 04-169076 | 6/1992 | | |
| JP | HEI 05-047383 | 2/1993 | | |
| JP | HEI 07-192721 | 7/1995 | | |
| JP | HEI 07-235292 | 9/1995 | | |
| JP | HEI 08-138670 | 5/1996 | | |
| JP | HEI 08-236114 | 9/1996 | | |
| JP | HEI 08-264183 | 10/1996 | | |
| JP | HEI 09-035715 | 2/1997 | | |
| JP | HEI 09-050810 | 2/1997 | | |
| JP | HEI 11-317230 | 11/1999 | | |
| JP | 2000-128539 | 5/2000 | | |
| JP | 2000-149950 | 5/2000 | | |
| JP | 2000-156227 | 6/2000 | | |
| JP | 2000-164214 | 6/2000 | | |
| JP | 2000-195517 | 7/2000 | | |
| JP | 2001-196063 | 7/2001 | | |
| JP | 2001-256979 | 9/2001 | | |
| JP | 2002-164053 | 6/2002 | | |
| JP | 2002-231227 | 8/2002 | | |
| JP | 2003-221235 | 8/2003 | | |
| JP | 2005-154256 | * | 6/2005 | ............ C01G 49/00 |
| JP | 2007-335331 | 12/2007 | | |
| JP | 2008-123972 | 5/2008 | | |
| JP | 2009-054583 | 3/2009 | | |

* cited by examiner

*Primary Examiner* — Raymond Alejandro
(74) *Attorney, Agent, or Firm* — Sony Corporation (57) ABSTRACT

Disclosed herein is a positive electrode active material wherein at least one metallic element M1 different from a principal transition metal element A is present at least at part of a surface of a lithium-containing transition metal oxide containing the principal transition metal element A, and, further, a compound of a metallic element M2 different from the metallic element M1 is present in a coating manner or in the vicinity of the lithium-containing transition metal oxide.

16 Claims, 1 Drawing Sheet

POSITIVE ELECTRODE ACTIVE MATERIAL, POSITIVE ELECTRODE, AND NONAQUEOUS ELECTROLYTE CELL

CROSS REFERENCES TO RELATED APPLICATIONS

The present application claims priority to Japanese Priority Patent Application JP 2009-172968 filed in the Japan Patent Office on Jul. 24, 2009, the entire content of which is hereby incorporated by reference.

BACKGROUND

The present application relates to a positive electrode and a nonaqueous electrolyte secondary cell, particularly to a positive electrode active material, a positive electrode and a nonaqueous electrolyte cell with which a high capacity and excellent charge-discharge cycle characteristics are secured and in which deterioration during use in a high-temperature environment is little.

Owing to the remarkable progress of mobile electronics technology in recent years, such electronic apparatuses as cellular phones and notebook size computers have come to be recognized as fundamental technology for supporting the advanced information society. In addition, research and development concerning enhancement of functions of these electronic apparatuses have been made vigorously, and the electric power consumption by each of the electronic apparatuses has also been steadily increasing accordingly. On the other hand, these electronic apparatuses are required to be driven for a prolonged time, and secondary cells and batteries as driving power sources for them have necessarily been desired to show an enhanced energy density. Besides, because of environmental concern, the secondary cells and batteries have also been desired to have a prolonged cycle life.

From the viewpoint of the volume, mass, etc. of the cell or battery incorporated in an electronic apparatus, a higher energy density of the cell or battery is more desirable. At present, lithium ion secondary cells or batteries have come to be incorporated in most of these apparatuses, because of their excellent energy density.

In lithium ion secondary cells, normally, lithium cobaltate is used for the positive electrode, while a carbon material is used for the negative electrode, and the operating voltage is set in the range of 4.2 to 2.5 V. The fact that the terminal voltage in the electric cell can be raised to 4.2 V is largely owing to the excellent electrochemical stability of the nonaqueous electrolyte material, separator and the like used in the cell.

Since the lithium ion secondary cells have a high charging voltage as compared with those of other cell systems, however, the lithium ion secondary cells have a problem in that their capacity would be deteriorated in a use mode in which the cells are left to stand for a long time in the charged state, resulting in a shortened battery life. In addition, where a lithium ion secondary cell is used in a high-temperature environment, a rise in internal resistance would proceeds, probably making it impossible to take out a sufficient capacity.

In order to solve the above-mentioned problems, Japanese Patent No. 3197763 (hereinafter referred to as Patent Document 1) describes addition of a metallic salt or hydroxide to a positive electrode. Besides, Japanese Patent Laid-open No. Hei 5-47383 (hereinafter referred to as Patent Document 2) describes coating of surfaces of lithium cobaltate ($LiCoO_2$) with phosphorus. Further, Japanese Patent No. 3172388 (hereinafter referred to as Patent Document 3) shows coating of a positive electrode active material or a surface of a positive electrode with a metallic oxide.

Japanese Patent Laid-open No. Hei 7-235292 (hereinafter referred to as Patent Document 4) describes an approach in which a lithium-transition metal compound oxide is uniformly deposited on surfaces of particles or is diffused into the particles from the surfaces. Japanese Patent Laid-open No. 2001-256979 (hereinafter referred to as Patent Document 5) describes a positive electrode active material in which lumps of a metallic oxide are deposited on a metallic oxide layer. Japanese Patent Laid-open No. 2002-164053 (hereinafter referred to as Patent Document 6) discloses a positive electrode active material layer in which surfaces of particles containing a lithium compound are provided thereon with at least one surface treatment layer containing at least two coating elements. Japanese Patent Laid-open No. 2003-221235 (hereinafter referred to as Patent Document 9) describes an approach in which the energy value of fluorine at surfaces of particles as measured by XPS (X-ray Photoelectron Spectroscopy) is specified.

Japanese Patent Nos. 3157413 and 3141858 (hereinafter referred to as Patent Documents 7 and 8) disclose a positive electrode active material in which a coating having a metallic fluoride is formed on surfaces of particles, and coating of particles with a crystalline metallic fluoride.

SUMMARY

The approach according to Patent Document 1, however, has a problem in that the resistance of the electrode would be raised, making it very difficult to obtain a sufficient capacity. The teaching of Patent Document 2 is unsatisfactory for practical use because the lowering in capacity due to the coating is so large. The adoption of only the coating element, the coating method and the form of coating disclosed in Patent Document 3 is insufficient for enhancing the cell performance in high-temperature environments. It also has a problem in that when the coating amount is increased in order to obtain the desired effect, diffusion of lithium ions is impeded, so that it is very difficult to obtain a sufficient capacity at charging and discharging current values in practical-use ranges.

The technology disclosed in Patent Document 4 makes it possible to maintain a high capacity, but is insufficient for enhancing cycle characteristics or for restraining the rise in resistance during high-temperature use. The teaching of Patent Document 5 has a problem in that it is very difficult to obtain satisfactory charge and discharge efficiencies, and the capacity would be lowered. The approach according to Patent Document 6 does not produce an observable effect on the rise of resistance, particularly, during high-temperature use.

According to Patent Documents 7 and 8, simple coating with a metallic fluoride which is low in electronic conductivity and lithium-ionic conductivity is only adopted, so that charge/discharge performance would be lowered considerably, and an effect obtainable on charge-discharge characteristics during high-temperature use would be insufficient. The teaching of Patent Document 9 yields an effect on high-temperature storage characteristic, but the effect is limited to that at the surfaces of particles and insufficient on the basis of performance in practical use.

Thus, there is a need for solving the above-mentioned problems. Specifically, there is a need for a positive electrode active material, a positive electrode and a nonaqueous electrolyte cell with which a high capacity and excellent charge-discharge cycle characteristics are secured and in which deterioration during use in high-temperature environments is little.

According to an embodiment, there is provided a positive electrode active material wherein at least one metallic element M1 different from a principal transition metal element A is present at least at part of a surface of a lithium-containing transition metal oxide containing the principal transition metal element A, and, further, a compound of a metallic element M2 different from the metallic element M1 is present in a coating manner or in the vicinity of the lithium-containing transition metal oxide.

According to another embodiment, there is provided a positive electrode including a positive electrode active material wherein at least one metallic element M1 different from a principal transition metal element A is present at least at part of a surface of a lithium-containing transition metal oxide containing the principal transition metal element A, and, further, a compound of a metallic element M2 different from the metallic element M1 is present in a coating manner or in the vicinity of the lithium-containing transition metal oxide.

According to a further embodiment, there is provided a nonaqueous electrolyte cell including a positive electrode having a positive electrode current collector provided thereon with a positive electrode active material layer containing a positive electrode active material, a negative electrode, and an electrolyte solution, wherein the positive electrode active material contains a material in which at least one metallic element M1 different from a principal transition metal element A is present at least at part of a surface of a lithium-containing transition metal oxide containing the principal transition metal element A, and, further, a metallic element M2 different from the metallic element M1 is present in a coating manner or in the vicinity of the lithium-containing transition metal oxide.

In accordance with embodiments, oxidation activity at surfaces of and in the vicinity of a positive electrode active material can be suppressed.

In accordance with embodiments, further, deterioration of a positive electrode active material and deterioration of an electrolyte solution in contact with the positive electrode active material are restrained, and a high cell capacity and excellent charge-discharge cycle characteristics can be obtained.

Additional features and advantages are described herein, and will be apparent from the following Detailed Description and the figures.

DETAILED DESCRIPTION

The present application is described below in detail with reference to the drawings according to an embodiment. The detailed description is provided as follows:

1. First embodiment (an example of a cylindrically shaped nonaqueous electrolyte secondary cell)

1. First Embodiment (1-1) On Positive Electrode Active Material in the Present Application Lithium-containing transition metal oxide such as lithium cobaltate ($LiCoO_2$) and lithium nickelate ($LiNiO_2$) are considered to have the following problems, as to the stability of a charged state of a cell:

(a) the reactivity at the interface between a positive electrode active material and an electrolyte solution is raised, whereby a transition metal component is eluted from the positive electrode, to cause deterioration of the active material and/or hindrance of release of occluded lithium due to crystallization of the eluted metal on the negative electrode side; and (b) a decomposition reaction of the electrolyte solution at the interface is accelerated, to cause deterioration of cell characteristics, such as formation of a coating film on the electrode surface or generation of gas.

As a result of further detailed investigation of the mechanism of deterioration, it was ascertained that deteriorations of other parts than the particles of the lithium-containing transition metal oxide (the particles will hereinafter be referred to as "compound oxide particles," when appropriate), such as the electrolyte solution, separator, binder, etc. were proceeding. It was also found out that in the case of compound oxide particles having undergone a surface treatment, characteristic deterioration was recognized also in other part than the compound oxide particles.

Further, when charging is so conducted as to obtain a maximum charging voltage of not less than 4.20 V, preferably not less than 4.35 V, more preferably not less than 4.40 V in the condition where the positive electrode-negative electrode ratio is designed to be appropriate, the energy density of the cell upon charging can be enhanced.

It was found out, however, as the charging voltage is raised, particularly where charging and discharging are repeated with a high charging voltage of not less than 4.25 V, deterioration of the compound oxide particles used as the active material and the electrolyte solution is accelerated, leading to a lowering in the charge-discharge cycle life and to deterioration of performance after high-temperature storage.

In relation to this problem, the present inventors made intensive and extensive investigations. As a result of their investigations, it was found out that in the case of compound oxide particles of which the surfaces have been modified, particularly where a metallic compound is present in the outside of the compound oxide particles, a high synergistic effect or a novel effect on enhancement of cell characteristics is generated. Based on this finding, the present application has been made. Thus, by use of the positive electrode active material as described below, it is possible to enhance cell characteristics and reliability of a nonaqueous electrolyte secondary cell (hereinafter referred to as "secondary cell," when appropriate).

Positive Electrode Active Material

In the present application, a metallic element M1 different from a principal transition metal A is present at least at part of surfaces of compound oxide particles containing the principal transition metal A. The metallic element M1 may be a plurality of elements. Further, a compound of a metallic element M2 is present in the state of coating (or being deposited on) the compound oxide particles or present in the vicinity of the compound oxide particles.

As the compound oxide particles, various known materials can be used. However, particles of a lithium compound oxide which has a laminar rock salt structure and in which the principal transition metal element A is at least one selected from the group consisting of at least Ni, Co and Mn are preferable, since the lithium compound oxide particles make it possible to obtain a high capacity. Besides, known materials which are the same as these lithium compound oxide particles except that an additive element or elements are introduced in a small amount(s) as substituent element(s) on a solid solution basis can also be used.

The metals constituting the metallic elements M1 and M2 are not particularly limited. However, the metallic elements M1 and M2 are preferably different elements, since they are expected to display different functions. Now, the metallic elements M1 and M2 will be described in detail below.

The metallic element M1 is at least one element which can be substituted for the principal transition metal element A on a solid solution basis, more preferably at least one element selected from the group consisting of Mn, Fe, Mg, Al, Ni, and Co. The state in which the metallic element M1 is present at the surfaces of the compound oxide particles is not particularly specified. However, it is effective for the metallic element M1 to be present in the state of having replaced the principal transition metal element A at the particle surfaces or in the state of having diffused from the surfaces into inside portions near the surfaces of the compound oxide particles so as to show a continuous concentration gradient toward the centers of the compound oxide particles.

The metallic element M1 is an element which has the function of suppressing an oxidation activity, particularly at the time of charging, at the surfaces of the compound oxide particles, and, in many cases, does not contribute to the charging/discharging capacity of the secondary cell. In view of this, the overall composition with atomic ratio of the compound oxide particles is preferably in the range of 0.001<(metallic element M1)/((metallic element M1)+(principal transition metal element A))<0.2.

The metallic element M2 is particularly preferably at least one element selected from the group consisting of Na, Li, Mg, Zr, Zn, Ba, Bi, Y, Ti, Al, and B, since a particularly high effect can be obtained by use of the at least one element. The metallic element M2 is an element which has the function of stabilizing the crystal structure of the compound oxide particles at the time of charging. It is preferable that the metallic element M2 is present in the state of coating, in the form of a compound of the metallic element M2, the compound oxide particles the surfaces of which are partly provided with the metallic element M1. It is also preferable that the metallic element M2 is present between the compound oxide particles the surfaces of which are partly provided with the metallic element M1.

Incidentally, it is preferable that the compound of the metallic element M2 does not contain any element that is identical or similar to the metallic element M1.

The form of the compound of the metallic element M2, also, is not particularly limited. It is preferable, however, that the compound of the metallic element M2 is in the form of a metallic salt, a metallic oxide or a metallic halide. In the case where the metallic element M2 is present in the form of a metallic salt, it is preferable that the average particle diameter of the metallic element M2 is not more than 25 μm, and that the overall composition with atomic ratio of the positive electrode active material after deposition of (coating with) the metallic element M2 is in the range of 0.001<(metallic element M2)/((metallic element M2)+(principal transition metal element A))<0.3. Where the metallic element M2 is present in the form of a metallic salt, a high effect can be exhibited when the metallic salt is a metallic salt containing phosphorus (P), particularly, at least one metallic salt represented by the formula: $(M2)_xPO_yF_z$, where $0<x\leq3$, $0<y\leq4$, and $0\leq z\leq6$.

In the case where the metallic element M2 is present in the form of a metallic oxide, it is preferable that the average particle diameter of the metallic element M2 is not more than 20 μm, and that the overall composition with atomic ratio of the positive electrode active material after deposition of (coating with) the metallic element M2 is in the range of 0.002<(metallic element M2)/((metallic element M2)+(principal transition metal element A))<0.15.

In the case where the metallic element M2 is present in the form of a metallic halide, it is preferable that the average particle diameter of the metallic element M2 is not more than 30 μm, and that the overall composition with atomic ratio of the positive electrode active material after deposition of (coating with) the metallic element M2 is in the range of 0.001<(metallic element M2)/((metallic element M2)+(principal transition metal element A))<0.15. As the metallic halide, particularly preferable is a metallic fluoride.

(1-2) Configuration of Nonaqueous Electrolyte Secondary Cell

Now, an embodiment will be described below, referring to the drawings.

Figure 1:
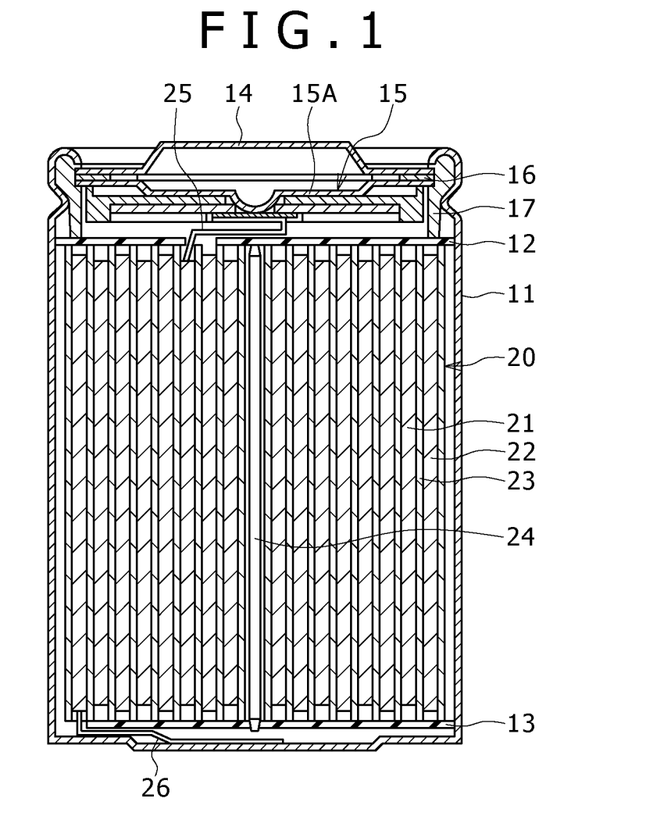
FIG. 1 is a sectional view showing a configuration example of a nonaqueous electrolyte cell according to an embodiment.

FIG. 1 shows a sectional structure of a secondary cell according to an embodiment. The cell is, for example, a lithium ion secondary cell.

As shown in FIG. 1, the secondary cell is a so-called cylindrical type cell, wherein a wound electrode body 20 having a belt-like positive electrode 21 and a belt-like negative electrode 22 stacked and wound with a separator 23 sandwiched therebetween is provided in the inside of a substantially hollow cylindrical cell can 11. The cell can 11 is formed from, for example, iron (Fe) plated with nickel (Ni), and it is closed at its one end portion and opened at its other end portion. In the inside of the cell can 11, a pair of insulating plates 12 and 13 are disposed perpendicularly to the circumferential surface of the wound electrode body 20, in the manner of clamping the wound electrode body 20 therebetween.

A cell cap 14, and a safety valve mechanism 15 and a positive temperature coefficient thermistor (PTC thermistor) 16, which are provided inside the cell cap 14, are mounted to the open end portion of the cell can 11 by caulking, with a gasket 17 interposed therebetween, and the inside of the cell can 11 is hermetically sealed. The cell cap 14 may be formed, for example, from a material which is identical or similar to the material of the cell can 11.

The safety valve mechanism 15 is electrically connected to the cell cap 14 through the thermistor 16. The safety valve mechanism 15 is so configured that when the internal pressure of the cell reaches or exceeds a predetermined value due to internal short-circuiting or external heating, a disk plate 15A is inverted to cut off the electrical connection between the cell cap 14 and the wound electrode body 20. The thermistor 16 is an element the resistance of which increases with a rise in temperature to restrict the current, thereby preventing heat from being generated due to a large current. The gasket 17 is, for example, formed by use of an insulating material, with its surface coated with asphalt.

The wound electrode body 20 is, for example, wound about a center pin 24. The positive electrode 21 of the wound electrode body 20 is connected with a positive electrode lead 25 formed from aluminum (Al) or the like, while the negative electrode 22 is connected with a negative electrode lead 26 formed from nickel (Ni) or the like. The positive electrode lead 25 is welded to the safety valve mechanism 15, whereby it is electrically connected to the cell cap 14, whereas the negative electrode 26 is welded to and electrically connected to the cell can 11.

Figure 2:
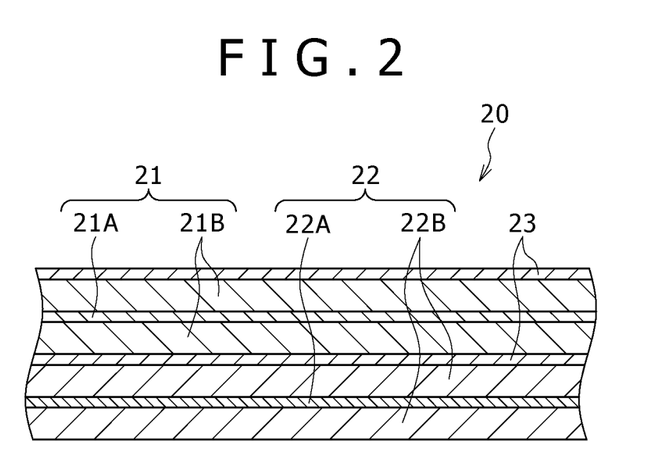
FIG. 2 is a sectional view showing, in an enlarged form, a part of a wound electrode body shown in FIG. 1.

FIG. 2 shows, in an enlarged form, a part of the wound electrode body 20 shown in FIG. 1.

Positive Electrode

The positive electrode 21 includes, for example, a positive electrode current collector 21A, and positive electrode active material layers 21B provided respectively on both sides of the positive electrode current collector 21A. Incidentally, there may be a region in which the positive electrode active material layer 21B is present on only one side of the positive electrode current collector 21A. The positive electrode current collector 21A is composed, for example, of a metallic foil such as an aluminum (Al) foil.

The positive electrode active material layer 21B includes, for example, a positive electrode active material, a conductive agent such as fibrous carbon, carbon black, etc. and a binder such as polyvinylidene fluoride (PVdF). As the positive electrode active material, those materials which have been described in the above section (1-1) can be used.

The conductive agent is not particularly limited, insofar as it can impart conductivity when mixed into the positive electrode active material in an appropriate quantity. For instance, carbon materials such as carbon black, graphite, etc. and the like can be used as the conductive agent. As the binder, those known binders which are ordinarily used for positive electrode compositions in cells of this type can be used. Preferably, a fluororesin such as polyvinyl fluoride (PVF), polyvinylidene fluoride (PVdF), and polytetrafluoroethylene (PTFE), etc. is used.

Negative Electrode

The negative electrode 22 includes, for example, a negative electrode current collector 22A, and negative electrode active material layers 22B provided respectively on both sides of the negative electrode current collector 22A. Incidentally, there may be a region in which the negative electrode active material layer 22B is present on only one side of the negative electrode current collector 22A. The negative electrode current collector 22A is composed, for example, of a metallic foil such as a copper (Cu) foil.

The negative electrode active material layer 22B contains, for example, a negative electrode active material, and may contain other materials not contributing to charging, such as a conductive agent, a binder or a viscosity controlling agent, if necessary. Examples of the conductive agent include graphite fibers, metallic fibers and metallic powders. Examples of the binder include fluoro-polymers such as polyvinylidene fluoride (PVdF), etc. and synthetic rubbers such as styrene-butadiene rubber (SBR), ethylene-propylene-diene rubber (EPDR), etc.

The negative electrode active material includes one or more than one of negative electrode materials which can occlude and release lithium (Li) electrochemically at a potential of not more than 2.0 V with reference to lithium metal.

Examples of the negative electrode materials which can occlude and release lithium (Li) include carbon materials, metallic compounds, oxides, sulfides, lithium nitrides such as $Li_3N$, etc., lithium metal, metals capable of alloying with lithium, and polymeric materials.

Examples of the carbon materials include difficulty graphitizable carbon, easily graphitizable carbon, graphite, pyrolytic carbons, cokes, vitreous carbons, fired products of organic polymers, carbon fibers, and activated carbon. Examples of the cokes include pitch coke, needle coke, and petroleum coke. The fired products of organic polymers mean carbonized products which are obtained by firing polymers such as phenolic resins, furan resins, etc. at an appropriate temperature, and some of which may be classified as difficulty graphitizable carbons or easily graphitizable carbons. Examples of the polymeric materials include polyacetylene, polypyrrole, etc.

Among the negative electrode materials capable of occluding and releasing lithium (Li), preferred are those which have charging-discharging potentials comparatively close to that of lithium metal. This is because it is easier to enhance the energy density of the cell as the charging-discharging potential of the negative electrode 22 is lower. Among others, the carbon materials are preferred in view of the fact that the changes in crystal structure generated at the times of charging and discharging are very slight, a high charge/discharge capacity can be obtained, and good cycling characteristics can be obtained. Especially, graphite is preferable in view of its high electrochemical equivalent and the high energy density it promises. Besides, the difficulty graphitizable carbon is preferable in view of the excellent cycling characteristic it promises.

Other examples of the negative electrode materials capable of occlusion and release of lithium (Li) include lithium metal as elementary substance, and elementary substances, alloys and compounds of metallic or semi-metallic elements capable of alloying with lithium (Li). These examples are preferable because they promise a high energy density, and, particularly, use thereof together with a carbon material is more preferable because good cycling characteristics as well as a high energy density can be thereby obtained. Incidentally, the alloys herein include not only those which are composed of two or more metallic elements but also those which are composed of at least one metallic element and at least one semi-metallic element. Examples of the structure of the alloys include solid solution, eutectic (eutectic mixture), intermetallic compound, and coexistence of two or more of them.

Examples of the metallic or semi-metallic elements include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y), and hafnium (Hf). Examples of the alloys or compounds of the metallic or semi-metallic elements include those represented by a chemical formula $Ma_fMb_gLi_h$ or $Ma_sMc_tMd_u$, where Ma represents at least one of metallic and semi-metallic elements capable of alloying with lithium; Mb represents at least one of metallic and semi-metallic elements which are other than lithium and Ma; Mc represents at least one of nonmetallic elements; Md represents at least one of metallic and semi-metallic elements other than Ma; and f, g, h, s, t and u have such values that $f>0$, $g\geq 0$, $h\geq 0$, $s>0$, $t>0$, and $u\geq 0$.

Among others, preferable are elementary substances, alloys and compounds of the metallic or semi-metallic elements of Group 4B in the short period periodic table, and particularly preferable are silicon (Si), tin (Sn), and their alloys and compounds. These elements, alloys and compounds may be either crystalline or amorphous.

Further examples of the negative electrode materials capable of occluding and releasing lithium include other metallic compounds than the above-mentioned, such as oxides, sulfides, and lithium nitrides such as $Li_3N$. Examples of the oxide include $MnO_2$, $V_2O_5$, $V_6O_{13}$, etc. Furthermore, examples of an oxide which has a comparatively base potential and which can occlude and release lithium include iron oxide, ruthenium oxide, molybdenum oxide, tungsten oxide, titanium oxide, tin oxide, etc. Examples of the sulfides include NiS, MoS, etc.

Separator

As the separator 23, for example, a porous polyethylene film, a porous polypropylene film, a nonwoven fabric of a synthetic resin, and the like can be used. The separator 23 is impregnated with a nonaqueous electrolyte solution which is a liquid electrolyte.

Nonaqueous Electrolyte Solution

The nonaqueous electrolyte solution contains a liquid solvent, for example, a nonaqueous solvent such as an organic solvent, and an electrolyte salt dissolved in the nonaqueous solvent.

The nonaqueous solvent, preferably, contains at least one of cyclic carbonic acid esters such as ethylene carbonate (EC), propylene carbonate (PC), etc. These cyclic carbonates promise enhanced cycle characteristics. Particularly, a non-aqueous solvent containing ethylene carbonate (EC) and propylene carbonate (PC) in mixture is more preferable, since it promises more enhanced cycle characteristics.

Besides, the nonaqueous solvent preferably contains at least one of chain carbonic acid esters such as diethyl carbonate (DEC), dimethyl carbonate (DMC), ethyl methyl carbonate (EMC), methyl propyl carbonate (MPC). These chain carbonates promise further enhanced cycle characteristics.

Further, the nonaqueous solvent may contain one or more selected from among butylenes carbonate, γ-butyrolactone, γ-valerolactone, compounds obtained by or as if obtained by replacing part or whole of hydroxyl groups of these compounds with fluorine group, 1,2-dimethoxyethane, tetrahydrofuran, 2-methyltetrahydrofuran, 1,3-dioxolan, 4-m ethyl-1,3-dioxolan, methyl acetate, methyl propionate, acetonitrile, glutaronitrile, adiponitrile, methoxyacetonitrile, 3-methoxypropylonitrile, N,N-dimethylformamide, N-methylpyrrolidinone, N-methyloxazolidinone, N,N-dimethylimidazolidinone, nitromethane, nitroethane, sulfolane, dimethyl sulfoxide, trimethyl phosphate, etc.

Depending on the electrodes used in combination with the nonaqueous solvent, there are some cases where the reversibility of the electrode reactions is enhanced by use of any of materials obtained by or as if obtained by substituting a fluorine atom(s) for part or whole of the hydrogen atoms of the materials included in the above-mentioned nonaqueous solvents. Therefore, such materials can be used, as required.

As the electrolyte salt, lithium salts can be used. Examples of the lithium salts include inorganic lithium salts such as lithium hexafluorophosphate ($LiPF_6$), lithium tetrafluoroborate ($LiBF_4$), lithium hexafluoroarsenate ($LiAsF_6$), lithium hexafluoroantimonate ($LiSbF_6$), lithium perchlorate ($LiClO_4$), lithium tetrachloroaluminate ($LiAlCl_4$), etc. and perfluoroalkanesulfonic acid derivatives such as lithium trifluoromethanesulfonate ($LiCF_3SO_3$), lithium bis(trifluoromethanesulfonyl)imide ($LiN(CF_3SO_2)_2$), lithium bis(pentafluoroethanesulfonyl)imide ($LiN(CF_5SO_2)_2$), lithium tris(trifluoromethanesulfonyl)methide ($LiC(CF_3SO_2)_3$), etc., which may be used either singly or in combination of two or more thereof. Among these lithium salts, lithium hexafluorophosphate ($LiPF_6$) is preferable because it promises a high ionic conductivity and enhanced cycle characteristics.

On the other hand, a solid electrolyte may be used in place of the nonaqueous electrolyte solution. As the solid electrolyte, both inorganic solid electrolytes and polymer solid electrolytes can be used insofar as they show lithium-ionic conductivity. Examples of the inorganic solid electrolytes include lithium nitride ($Li_3N$), lithium iodide (LiI), etc. The polymer solid electrolytes are each composed of an electrolyte salt and a polymeric compound for dissolving the electrolyte salt. Examples of the polymeric compound include ether polymers such as poly(ethylene oxide) and crosslinked products thereof, polymethacrylates, polyacrylates, etc., which may be used singly, in the state of being copolymerized in molecule, or in mixture.

Furthermore, a gelled electrolyte may also be used. As a matrix polymer in the gelled electrolyte, any of various polymers can be utilized insofar as the polymer is gelled through absorbing the above-mentioned nonaqueous electrolyte solution. Examples of the polymers which can be used as the matrix polymer include fluoro-polymers such as poly(vinylidene fluoride), poly(vinylidene fluoride-co-hexafluoropropylene), etc., ether polymers such as poly(ethylene oxide), crosslinked products thereof, etc., poly(acrylonitrile) and so on. Particularly, fluoro-polymers are desirable for use, in view of their oxidation-reduction stability. When the electrolyte salt is contained in the matrix polymer, the resulting material shows ionic conductivity.

The nonaqueous electrolyte cell as above-described may be used with an upper limit charging voltage in the range from 4.25 to 4.80 V and a lower limit discharging voltage in the range from 2.00 to 3.30 V, whereby the effects of the positive electrode active material according to an embodiment can be secured more conspicuously.

(1-3) Method of Fabricating Nonaqueous Electrolyte Secondary Cell

The secondary cell as above can be manufactured, for example, as described below. First, an example of the method of preparing the positive electrode active material according to an embodiment will be described.

Method of Preparing Positive Electrode Active Material

The method of preparing the positive electrode active material according to an embodiment is not particularly limited. As for the method by which the metallic element M1 is caused to be present at surfaces of the compound oxide particles, also, various dry-type, wet-type or other known methods are applicable as the method in consideration.

For instance, as a dry-type method, a method can be used in which the compound oxide particles and the compound containing the metallic element M1 are subjected to comminution, mixing and deposition (coating) by use of a ball mill, a chaser mill, a pulverizer or the like. In this case, it is effective to carry out the comminution by adding an amount of a liquid component which can be exemplified by water. Besides, the deposition of (coating with) the compound containing the metallic element M1 can be performed by a mechanochemical treatment or by a vapor phase method such as sputtering, CVD (Chemical Vapor Deposition), etc.

Besides, as a wet-type method, there can be used a method in which the compound oxide particles and the metallic element M1 are mixed in water or in a solvent such as ethanol, or a method in which the compound oxide particles are provided with surfaces containing the metallic element M1 through, for example, crystallization which is effected by neutralization in a liquid phase.

Further, a method may be used in which elements to be raw materials for a predetermined coating layer are mixed into an electrolyte solution or an electrode, thereby fabricating a secondary cell, which is then subjected to charge-discharge cycles, warming or the like to form the coating layer. The method of incorporating the compound of the metallic element M2 into the positive electrode active material is not particularly limited. Examples of the method which can be used include a method in which a powder of the compound of the metallic element M2 is simply mixed, and a method in which a substance to be a precursor of the desired compound is incorporated and then a reaction such as electrolysis, pyrolysis, etc. is carried out to achieve the desired incorporation.

The lithium-transition metal compound oxide obtained may be one which has been treated by a known technology such as control of powder characteristics.

Method of Producing Positive Electrode

For instance, a positive electrode active material, a conductive agent and a binder are mixed together to prepare a positive electrode composition, which is dispersed in a solvent such as N-methylpyrrolidone, to obtain a positive electrode composition slurry. Subsequently, the positive electrode composition slurry is applied to a positive electrode current collector 21A, and, after the solvent is evaporated off, compression molding is conducted by use of a roll pressing machine or the like to form positive electrode active material layers 21B, thereby producing a positive electrode 21.

Method of Producing Negative Electrode

For example, a negative electrode active material and a binder are mixed with each other to prepare a negative electrode composition, which is dispersed in a solvent such as N-methylpyrrolidone, to obtain a negative electrode composition slurry. Subsequently, the negative electrode composition slurry is applied to a negative electrode current collector 22A, and, after the solvent is evaporated off, compression molding is conducted by use of a roll pressing machine or the like to form negative electrode active material layers 22B, thereby producing a negative electrode 22.

Assembly of Nonaqueous Electrolyte Secondary Cell

Next, a positive electrode lead 25 is attached to the positive electrode current collector 21 by welding or the like, and a negative electrode lead 26 is attached to the negative electrode current collector 22 by welding or the like. Thereafter, the positive electrode 21 and the negative electrode 22 are wound, with a separator 23 sandwiched therebetween. A tip portion of the positive electrode lead 25 is welded to a safety valve mechanism 15, and a tip portion of the negative electrode lead 26 is welded to a cell can 11. The wound body of the positive electrode 21 and the negative electrode 22 is clamped between a pair of insulating plates 12 and 13, and the resulting assembly is accommodated in the inside of the cell can 11.

After the positive electrode 21 and the negative electrode 22 are accommodated in the inside of the cell can 11, the above-mentioned electrolyte solution is introduced into the inside of the cell can 11, to impregnate the separator 23 therewith. Thereafter, a cell cap 14, the safety valve mechanism 15 and a thermistor 16 are fixed to an open end portion of the cell can 11 by caulking, with a gasket 17 interposed therebetween. By these steps, a secondary cell as shown in FIG. 1 can be manufactured.

EXAMPLES

Now, the present application will be described specifically below by showing examples, which are not to be construed as limitative of the application.

Example 1

Production of Positive Electrode

First, lithium cobaltate ($LiCoO_2$) having an average particle diameter of 13 µm as measured by a laser scattering method was admixed with magnesium carbonate ($MgCO_3$) in weighed quantities such as to obtain an atomic ratio of Co:Mg=99:1 (M1/(M1+A)=0.01). Subsequently, the admixture was treated by a mechanochemical apparatus for an hour so that magnesium carbonate was deposited on surfaces of lithium cobaltate particles serving as a center material, to produce a pre-firing precursor.

Next, the pre-firing precursor was heated up at a rate of 3° C./min, was held at 900° C. for three hours, and slowly cooled, to obtain particles in which magnesium (Mg) was uniformly distributed on surfaces of lithium cobaltate particles. The thus obtained particles were admixed with lithium phosphate ($Li_3PO_4$) so comminuted as to have an average particle diameter of 0.8 µm in such quantities as to obtain an atomic ratio of Co:Li (exclusive of Li in $LiCoO_2$)=98:2 (M2/(M2+A)=0.02), and the resulting admixture was mixed and stirred at high speed, to obtain a lithium-transition metal compound oxide according to an embodiment.

The powder thus obtained was observed by a scanning electron microscope (SEM) equipped with an energy dispersive X-ray analyzer (EDX) (the system will hereinafter be referred to as SEM/EDX). It was confirmed that magnesium was uniformly distributed over the whole surfaces of the particles of the lithium-transition metal compound oxide. It was also confirmed that lithium phosphate was present in the state of being deposited on the surfaces of the lithium-transition metal compound oxide particles or present between the particles.

In addition, the powder was served to measurement of a powder X-ray diffraction (XRD) pattern using long-wavelength CuKα. In addition to a diffraction peak corresponding to lithium cobaltate having a laminar rock salt structure, a diffraction peak of lithium phosphate was confirmed. Besides, a particle section was cut, and the distributions of elements in the radial direction were measured by Auger electron spectroscopy, whereon it was observed that the magnesium concentration was varying continuously from the surface toward the inside of the particle.

By using the lithium-transition metal compound oxide obtained in the above-mentioned manner as a positive electrode active material, a secondary cell was fabricated as described below, and was put to evaluation of variations in internal resistance as well as cycle characteristics under a high-temperature environmental condition.

A positive electrode composition was prepared by mixing 98 wt. % of the positive electrode active material, 0.8 wt. % of an amorphous carbon powder (Ketchen black) as a conductive agent, and 1.2 wt. % of polyvinylidene fluoride (PVdF) as a binder. The positive electrode composition was dispersed in N-methyl-2-pyrrolidone (NMP) to prepare a positive electrode composition slurry, which was uniformly applied to both sides of a positive electrode current collector composed of a belt-like aluminum foil. After the positive electrode composition slurry thus applied was dried, compression molding was conducted by use of a roll pressing machine, to form positive electrode active material layers. Finally, a positive electrode terminal made of aluminum (Al) was attached to an exposed portion of the positive electrode current collector of the positive electrode.

Production of Negative Electrode

A negative electrode composition was prepared by mixing 95 wt. % of a graphite powder as a negative electrode active material with 5 wt. % of polyvinylidene fluoride (PVdF) as a binder. The negative electrode composition was dispersed in N-methyl-2-pyrrolidone (NMP) to prepare a negative electrode composition slurry, which was uniformly applied to both sides of a negative electrode current collector composed of a belt-like copper foil. Then, the negative electrode composition slurry thus applied was subjected to press molding under heating, to form negative electrode active material layers. Finally, a negative electrode terminal made of nickel (Ni) was attached to an exposed portion of the negative electrode current collector of the negative electrode.

Assembly of Cell

The belt-like positive electrode and the belt-like negative electrode obtained as above were stacked together, with a 25 µm-thick microporous polyolefin film as a separator interposed therebetween, and the stacked body was wound a large number of times along the longitudinal direction thereof, to produce a spirally wound electrode body. The electrode body was accommodated in a cell can made of nickel-plated iron, and insulating plates are disposed respectively on both upper end lower sides of the electrode body. Next, the positive electrode terminal connected to the positive electrode current collector was led out, and was welded to a protruding portion of a safety valve securely electrically connected to a cell cap. Also, the negative electrode terminal was led out from the negative electrode current collector, and was welded to a bottom portion of the cell can.

On the other hand, in a mixed solution of ethylene carbonate (EC) and methyl ethyl carbonate (MEC) in a volume mixing ratio of 1:1, lithium hexafluorophosphate ($LiPF_6$) was dissolved so as to obtain a concentration of 1 $mol/dm^3$, thereby preparing an electrolyte solution. Finally, the electrolyte solution was introduced into the cell can in which the electrode body had been disposed, and a safety valve, a PTC thermistor and a cell can was fixed by caulking the cell can, with an insulating sealing gasket therebetween, to produce a cylindrical cell measuring 18 mm in outside diameter and 65 mm in height.

Evaluation of Cylindrical Cell (1) Initial Capacity

The cylindrical cell manufactured as above was subjected to constant-current charging at a charging current of 1.5 A at an environmental temperature of 45° C. until the cell voltage reached 4.35 V, and was then subjected to constant-voltage charging at the cell voltage of 4.35 V until the total charging time reached 2.5 hours. Thereafter, discharging at a discharging current of 2.0 A was conducted, and the discharge capacity until the cell voltage was lowered to 3.0 V (the discharge capacity in the first cycle of discharge) was measured as initial capacity.

(2) Capacity Retention

Charging and discharging were repeated under the same conditions as in the above-mentioned charging and discharging, the discharge capacity upon the 300th cycle was measured, and capacity retention was calculated. The capacity retention after 300 cycles was determined by the formula: {((discharge capacity upon 300th cycle)/(initial capacity))× 100}[%].

For the following Examples and Comparative Examples, the initial capacity and the capacity retention upon the 300th cycle were measured in the same manner as in Example 1 above. The measurement results will be given in Tables 1 and 2 later.

Example 2

A cylindrical cell was manufactured in the same manner as in Example 1 except that particles in which aluminum (Al) was uniformly distributed on surfaces of lithium cobaltate particles, obtained using aluminum hydroxide ($Al(OH)_3$) in place of magnesium carbonate ($MgCO_3$), were used and that lithium cobaltate and aluminum hydroxide were mixed in quantities such as to obtain an atomic ratio of Co:Al=99:1 (M1/(M1+A)=0.01). The cylindrical cell was evaluated in the same manner as in Example 1.

Upon observation of the powder obtained in Example 2 by SEM/EDX, it was confirmed that aluminum was uniformly distributed over the whole surfaces of particles of the lithium-transition metal compound oxide. Also, like in Example 1, it was confirmed that lithium phosphate was present in the state of being deposited on the surfaces of the particles of the lithium-transition metal compound oxide or present between the particles.

Besides, the powder obtained in Example 2 was served to measurement of a powder X-ray diffraction pattern using CuKα, upon which a diffraction peak of lithium phosphate was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the aluminum concentration was varying continuously from the surface to the inside of the particle.

Example 3

A cylindrical cell was manufactured in the same manner as in Example 1 except that aluminum hydroxide ($Al(OH)_3$) was used in place of magnesium carbonate ($MgCO_3$), and magnesium pyrophosphate ($Mg_2P_2O_7$) comminuted to have an average particle diameter of 1.1 μm was used in place of lithium phosphate ($Li_3PO_4$). In this case, lithium cobaltate and aluminum hydroxide were mixed in such quantities as to obtain an atomic ratio of Co:Al=99:1 (M1/(M1+A)=0.01). Besides, lithium cobaltate and magnesium pyrophosphate were mixed in quantities such as to obtain an atomic ratio of Co:Mg=98.2 (M1/(M1+A)=0.02). The cylindrical cell thus obtained was evaluated in the same manner as in Example 1.

Upon observation of the powder obtained in Example 3 by SEM/EDX, it was confirmed that aluminum was uniformly distributed over the whole surfaces of particles of the lithium-transition metal compound oxide. Also, it was confirmed that lithium pyrophosphate was present in the state of being deposited on the surfaces of the particles of the lithium-transition metal compound oxide or present between the particles.

Besides, the powder obtained in Example 3 was served to measurement of a powder X-ray diffraction pattern using CuKα, upon which a diffraction peak of lithium pyrophosphate was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the aluminum concentration was varying continuously from the surface to the inside of the particle.

Example 4

A cylindrical cell was manufactured in the same manner as in Example 1, except that particles in which manganese (Mn) was uniformly distributed on surfaces of lithium cobaltate particles, obtained using manganese carbonate ($MnCO_3$) in place of magnesium carbonate ($MgCO_3$), were used and that lithium cobaltate and manganese carbonate were mixed in quantities such as to obtain an atomic ratio of Co:Mn=99:1 (M1/(M1+A)=0.01). The cylindrical cell thus obtained was evaluated in the same manner as in Example 1.

Upon observation of the powder obtained in Example 4 by SEM/EDX, it was confirmed that manganese was uniformly distributed over the whole surfaces of particles of the lithium-transition metal compound oxide. Also, like in Example 1, it was confirmed that lithium phosphate was present in the state of being deposited on the surfaces of the particles of the lithium-transition metal compound oxide or present between the particles.

Besides, the powder obtained in Example 4 was served to measurement of a powder X-ray diffraction pattern using CuKα, upon which a diffraction peak of lithium phosphate was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the manganese concentration was varying continuously from the surface to the inside of the particle.

Example 5

A cylindrical cell was manufactured in the same manner as in Example 1, except that lithium cobaltate ($LiCoO_2$) and magnesium carbonate ($MgCO_3$) were mixed in such quantities as to obtain an atomic ratio of Co:Mg=99.8:0.2 (M1/(M1+A)=0.002). The cylindrical cell thus obtained was evaluated in the same manner as in Example 1.

Upon observation of the powder obtained in Example 5 by SEM/EDX, it was confirmed that magnesium was uniformly distributed over the whole surfaces of particles of the lithium-transition metal compound oxide. Also, like in Example 1, it was confirmed that lithium phosphate was present in the state of being deposited on the surfaces of the particles of the lithium-transition metal compound oxide or present between the particles.

Besides, the powder obtained in Example 5 was served to measurement of a powder X-ray diffraction pattern using CuKα, upon which a diffraction peak of lithium phosphate was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 6

A cylindrical cell was manufactured in the same manner as in Example 1, except that lithium cobaltate ($LiCoO_2$) and magnesium carbonate ($MgCO_3$) were mixed in such quantities as to obtain an atomic ratio of Co:Mg=84:16 (M1/(M1+A)=0.16). The cylindrical cell was evaluated in the same manner as in Example 1.

Upon observation of the powder obtained in Example 6 by SEM/EDX, it was confirmed that magnesium was uniformly distributed over the whole surfaces of particles of the lithium-transition metal compound oxide. Also, like in Example 1, it was confirmed that lithium phosphate was present in the state of being deposited on the surfaces of the particles of the lithium-transition metal compound oxide or present between the particles.

Besides, the powder obtained in Example 6 was served to measurement of a powder X-ray diffraction pattern using CuKα, upon which a diffraction peak of lithium phosphate was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 7

A cylindrical cell was manufactured in the same manner as in Example 1, except that lithium sulfate ($Li_2SO_4$) comminuted to have an average particle diameter of 1.0 μm was used in place of lithium phosphate ($Li_3PO_4$) and that lithium cobaltate and lithium sulfate were mixed in such quantities as to obtain an atomic ratio of Co:Li (exclusive of Li in $LiCoO_2$)= 98:2 (M2/(M2+A)=0.02). The cylindrical cell was evaluated in the same manner as in Example 1.

Upon observation of the powder obtained in Example 7 by SEM/EDX, it was confirmed that magnesium was uniformly distributed over the whole surfaces of particles of the lithium-transition metal compound oxide. Also, it was confirmed that lithium sulfate was present in the state of being deposited on the surfaces of the particles of the lithium-transition metal compound oxide or present between the particles.

Besides, the powder obtained in Example 7 was served to measurement of a powder X-ray diffraction pattern using CuKα, upon which a diffraction peak of lithium sulfate was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 8

A cylindrical cell was manufactured in the same manner as in Example 1, except that lithium monofluorophosphate ($Li_2PO_3F$) comminuted to have an average particle diameter of 0.6 μm was used in place of lithium phosphate ($Li_3PO_4$) and that lithium cobaltate and lithium monofluorophosphate were mixed in such quantities as to obtain an atomic ratio of Co:Li (exclusive of Li in $LiCoO_2$)=98:2 (M2/(M2+A)=0.02). The cylindrical cell thus obtained was evaluated in the same manner as in Example 1.

Upon observation of the powder obtained in Example 8 by SEM/EDX, it was confirmed that magnesium was uniformly distributed over the whole surfaces of particles of the lithium-transition metal compound oxide. Also, it was confirmed that lithium monofluorophosphate was present in the state of being deposited on the surfaces of the particles of the lithium-transition metal compound oxide or present between the particles.

Besides, the powder obtained in Example 8 was served to measurement of a powder X-ray diffraction pattern using CuKα, upon which a diffraction peak of lithium monofluorophosphate was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 9

A cylindrical cell was manufactured in the same manner as in Example 1, except that the proportion of lithium phosphate ($Li_3PO_4$) added was so set as to obtain an atomic ratio of Co:Li (exclusive of Li in $LiCoO_2$)=99.8:0.2 (M2/(M2+A)= 0.002). The cylindrical cell thus obtained was evaluated in the same manner as in Example 1.

Upon observation of the powder obtained in Example 9 by SEM/EDX, it was confirmed that magnesium was uniformly distributed over the whole surfaces of particles of the lithium-transition metal compound oxide. Also, it was confirmed that lithium phosphate was present in the state of being deposited on the surfaces of the particles of the lithium-transition metal compound oxide or present between the particles.

Besides, the powder obtained in Example 9 was served to measurement of a powder X-ray diffraction pattern using CuKα, upon which a diffraction peak of lithium phosphate was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 10

A cylindrical cell was manufactured in the same manner as in Example 1, except that the proportion of lithium phosphate ($Li_3PO_4$) added was so set as to obtain an atomic ratio of Co:Li (exclusive of Li in $LiCoO_2$)=74:26 (M2/(M2+A)= 0.26). The cylindrical cell thus obtained was evaluated in the same manner as in Example 1.

Upon observation of the powder obtained in Example 10 by SEM/EDX, it was confirmed that magnesium was uniformly distributed over the whole surfaces of particles of the lithium-transition metal compound oxide. Also, it was confirmed that lithium phosphate was present in the state of being deposited on the surfaces of the particles of the lithium-transition metal compound oxide or present between the particles.

Besides, the powder obtained in Example 10 was served to measurement of a powder X-ray diffraction pattern using CuKα, upon which a diffraction peak of lithium phosphate was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 11

A cylindrical cell was manufactured in the same manner as in Example 1, except that lithium phosphate ($Li_3PO_4$) having an average particle diameter of 10 μm, obtained by changing the comminution condition for lithium phosphate ($Li_3PO_4$), was used in place of lithium phosphate ($Li_3PO_4$) having an average particle diameter of 0.8 μm. The cylindrical cell thus obtained was evaluated in the same manner as in Example 1.

Upon observation of the powder obtained in Example 11 by SEM/EDX, it was confirmed that magnesium was uniformly distributed over the whole surfaces of particles of the lithium-transition metal compound oxide. Also, it was confirmed that lithium phosphate was present in the state of being deposited on the surfaces of the particles of the lithium-transition metal compound oxide or present between the particles.

Besides, the powder obtained in Example 11 was served to measurement of a powder X-ray diffraction pattern using CuKα, upon which a diffraction peak of lithium phosphate was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 12

A cylindrical cell was manufactured in the same manner as in Example 1, except that lithium phosphate ($Li_3PO_4$) having an average particle diameter of 21 μm, obtained by changing the comminution condition for lithium phosphate ($Li_3PO_4$), was used in place of lithium phosphate ($Li_3PO_4$) having an average particle diameter of 0.8 μm. The cylindrical cell thus obtained was evaluated in the same manner as in Example 1.

Upon observation of the powder obtained in Example 12 by SEM/EDX, it was confirmed that magnesium was uniformly distributed over the whole surfaces of particles of the lithium-transition metal compound oxide. Also, it was confirmed that lithium phosphate was present in the state of being deposited on the surfaces of the particles of the lithium-transition metal compound oxide or present between the particles.

Besides, the powder obtained in Example 12 was served to measurement of a powder X-ray diffraction pattern using CuKα, upon which a diffraction peak of lithium phosphate was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 13

A cylindrical cell was manufactured in the same manner as in Example 1, except that zirconium oxide ($ZrO_2$) having an average particle diameter of 0.7 μm was used in place of lithium phosphate ($Li_3PO_4$) having an average particle diameter of 0.8 μm and that the proportion of zirconium oxide added was so set as to obtain an atomic ratio of Co:Zr=98.5: 1.5 (M2/(M2+A)=0.015). The cylindrical cell thus obtained was evaluated in the same manner as in Example 1.

Upon observation of the powder obtained in Example 13 by SEM/EDX, it was confirmed that magnesium was uniformly distributed over the whole surfaces of particles of the lithium-transition metal compound oxide. Also, it was confirmed that zirconium oxide was present in the state of being deposited on the surfaces of the particles of the lithium-transition metal compound oxide or present between the particles.

Besides, the powder obtained in Example 13 was served to measurement of a powder X-ray diffraction pattern using CuKα, upon which a diffraction peak of zirconium oxide was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 14

A cylindrical cell was manufactured in the same manner as in Example 1, except that titanium oxide ($TiO_2$) having an average particle diameter of 0.6 μm was used in place of lithium phosphate ($Li_3PO_4$) having an average particle diameter of 0.8 μm and that the proportion of zirconium oxide added was so set as to obtain an atomic ratio of Co:Ti=98.5:1.5 (M2/(M2+A)=0.015). The cylindrical cell thus obtained was evaluated in the same manner as in Example 1.

Upon observation of the powder obtained in Example 14 by SEM/EDX, it was confirmed that magnesium was uniformly distributed over the whole surfaces of particles of the lithium-transition metal compound oxide. Also, it was confirmed that titanium oxide was present in the state of being deposited on the surfaces of the particles of the lithium-transition metal compound oxide or present between the particles.

Besides, the powder obtained in Example 14 was served to measurement of a powder X-ray diffraction pattern using CuKα, upon which a diffraction peak of titanium oxide was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 15

A cylindrical cell was manufactured in the same manner as in Example 1, except that zinc oxide (ZnO) having an average particle diameter of 0.9 μm was used in place of lithium phosphate ($Li_3PO_4$) having an average particle diameter of 0.8 μm and that the proportion of zinc oxide added was so set as to obtain an atomic ratio of Co:Zn=98.5:1.5 (M2/(M2+A)=0.015). The cylindrical cell thus obtained was evaluated in the same manner as in Example 1.

Upon observation of the powder obtained in Example 15 by SEM/EDX, it was confirmed that magnesium was uniformly distributed over the whole surfaces of particles of the lithium-transition metal compound oxide. Also, it was confirmed that zinc oxide was present in the state of being deposited on the surfaces of the particles of the lithium-transition metal compound oxide or present between the particles.

Besides, the powder obtained in Example 15 was served to measurement of a powder X-ray diffraction pattern using CuKα, upon which a diffraction peak of zinc oxide was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 16

A cylindrical cell was manufactured in the same manner as in Example 1, except that zirconium oxide ($ZrO_2$) having an average particle diameter of 0.7 μm was used in place of lithium phosphate ($Li_3PO_4$) having an average particle diameter of 0.8 μm and that the proportion of zirconium oxide added was so set as to obtain an atomic ratio of Co:Zr=99.7:0.3 (M2/(M2+A)=0.003). The cylindrical cell thus obtained was evaluated in the same manner as in Example 1.

Upon observation of the powder obtained in Example 16 by SEM/EDX, it was confirmed that magnesium was uniformly distributed over the whole surfaces of particles of the lithium-transition metal compound oxide. Also, it was confirmed that zirconium oxide was present in the state of being deposited on the surfaces of the particles of the lithium-transition metal compound oxide or present between the particles.

Besides, the powder obtained in Example 16 was served to measurement of a powder X-ray diffraction pattern using CuKα, upon which a diffraction peak of zirconium oxide was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 17

A cylindrical cell was manufactured in the same manner as in Example 1, except that zirconium oxide ($ZrO_2$) having an average particle diameter of 0.7 μm was used in place of lithium phosphate ($Li_3PO_4$) having an average particle diameter of 0.8 μm and that the proportion of zirconium oxide added was so set as to obtain an atomic ratio of Co:Zr=87:13 (M2/(M2+A)=0.13). The cylindrical cell thus obtained was evaluated in the same manner as in Example 1.

Upon observation of the powder obtained in Example 17 by SEM/EDX, it was confirmed that magnesium was uniformly distributed over the whole surfaces of particles of the lithium-transition metal compound oxide. Also, it was confirmed that zirconium oxide was present in the state of being deposited on the surfaces of the particles of the lithium-transition metal compound oxide or present between the particles.

Besides, the powder obtained in Example 17 was served to measurement of a powder X-ray diffraction pattern using CuKα, upon which a diffraction peak of zirconium oxide was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 18

A cylindrical cell was manufactured in the same manner as in Example 1, except that zirconium oxide ($ZrO_2$) having an average particle diameter of 8 μm was used in place of lithium phosphate ($Li_3PO_4$) having an average particle diameter of 0.8 μm and that the proportion of zirconium oxide added was so set as to obtain an atomic ratio of Co:Zr=98.5:1.5 (M2/(M2+A)=0.015). The cylindrical cell thus obtained was evaluated in the same manner as in Example 1.

Upon observation of the powder obtained in Example 18 by SEM/EDX, it was confirmed that magnesium was uniformly distributed over the whole surfaces of particles of the lithium-transition metal compound oxide. Also, it was confirmed that zirconium oxide was present in the state of being deposited on the surfaces of the particles of the lithium-transition metal compound oxide or present between the particles.

Besides, the powder obtained in Example 18 was served to measurement of a powder X-ray diffraction pattern using CuKα, upon which a diffraction peak of zirconium oxide was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 19

A cylindrical cell was manufactured in the same manner as in Example 1, except that zirconium oxide ($ZrO_2$) having an average particle diameter of 17 μm was used in place of lithium phosphate ($Li_3PO_4$) having an average particle diameter of 0.8 μm and that the proportion of zirconium oxide added was so set as to obtain an atomic ratio of Co:Zr=98.5:1.5 (M2/(M2+A)=0.015). The cylindrical cell thus obtained was evaluated in the same manner as in Example 1.

Upon observation of the powder obtained in Example 19 by SEM/EDX, it was confirmed that magnesium was uniformly distributed over the whole surfaces of particles of the lithium-transition metal compound oxide. Also, it was confirmed that zirconium oxide was present in the state of being deposited on the surfaces of the particles of the lithium-transition metal compound oxide or present between the particles.

Besides, the powder obtained in Example 19 was served to measurement of a powder X-ray diffraction pattern using CuKα, upon which a diffraction peak of zirconium oxide was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 20

A cylindrical cell was manufactured in the same manner as in Example 1, except that lithium fluoride (LiF) having an average particle diameter of 1.0 μm was used in place of lithium phosphate ($Li_3PO_4$) having an average particle diameter of 0.8 μm and that the proportion of lithium fluoride added was so set as to obtain an atomic ratio of Co:Li (exclusive of Li in $LiCoO_2$)=98:2 (M2/(M2+A)=0.02). The cylindrical cell thus obtained was evaluated in the same manner as in Example 1.

Upon observation of the powder obtained in Example 20 by SEM/EDX, it was confirmed that magnesium was uniformly distributed over the whole surfaces of particles of the lithium-transition metal compound oxide. Also, it was confirmed that lithium fluoride was present in the state of being deposited on the surfaces of the particles of the lithium-transition metal compound oxide or present between the particles.

Besides, the powder obtained in Example 20 was served to measurement of a powder X-ray diffraction pattern using CuKα, upon which a diffraction peak of lithium fluoride was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 21

A cylindrical cell was manufactured in the same manner as in Example 1, except that aluminum fluoride ($AlF_3$) having an average particle diameter of 1.2 μm was used in place of lithium phosphate ($Li_3PO_4$) having an average particle diameter of 0.8 μm and that the proportion of aluminum fluoride added was so set as to obtain an atomic ratio of Co:Al=98:2 (M2/(M2+A)=0.02). The cylindrical cell thus obtained was evaluated in the same manner as in Example 1.

Upon observation of the powder obtained in Example 21 by SEM/EDX, it was confirmed that magnesium was uniformly distributed over the whole surfaces of particles of the lithium-transition metal compound oxide. Also, it was confirmed that aluminum fluoride was present in the state of being deposited on the surfaces of the particles of the lithium-transition metal compound oxide or present between the particles.

Besides, the powder obtained in Example 21 was served to measurement of a powder X-ray diffraction pattern using CuKα, upon which a diffraction peak of aluminum fluoride was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 22

A cylindrical cell was manufactured in the same manner as in Example 1, except that yttrium fluoride ($YF_3$) having an average particle diameter of 1.1 μm was used in place of lithium phosphate ($Li_3PO_4$) having an average particle diameter of 0.8 μm and that the proportion of yttrium fluoride added was so set as to obtain an atomic ratio of Co:Y=98:2 (M2/(M2+A)=0.02). The cylindrical cell thus obtained was evaluated in the same manner as in Example 1.

Upon observation of the powder obtained in Example 22 by SEM/EDX, it was confirmed that magnesium was uniformly distributed over the whole surfaces of particles of the lithium-transition metal compound oxide. Also, it was confirmed that yttrium fluoride was present in the state of being deposited on the surfaces of the particles of the lithium-transition metal compound oxide or present between the particles.

Besides, the powder obtained in Example 22 was served to measurement of a powder X-ray diffraction pattern using CuKα, upon which a diffraction peak of yttrium fluoride was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 23

A cylindrical cell was manufactured in the same manner as in Example 1, except that lithium fluoride (LiF) having an average particle diameter of 1.0 μm was used in place of lithium phosphate ($Li_3PO_4$) having an average particle diameter of 0.8 μm and that the proportion of lithium fluoride added was so set as to obtain an atomic ratio of Co:Li (exclusive of Li in $LiCoO_2$)=99.8:0.2 (M2/(M2+A)=0.002). The cylindrical cell thus obtained was evaluated in the same manner as in Example 1.

Upon observation of the powder obtained in Example 23 by SEM/EDX, it was confirmed that magnesium was uniformly distributed over the whole surfaces of particles of the lithium-transition metal compound oxide. Also, it was confirmed that lithium fluoride was present in the state of being deposited on the surfaces of the particles of the lithium-transition metal compound oxide or present between the particles.

Besides, the powder obtained in Example 23 was served to measurement of a powder X-ray diffraction pattern using CuKα, upon which a diffraction peak of lithium fluoride was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 24

A cylindrical cell was manufactured in the same manner as in Example 1, except that lithium fluoride (LiF) having an average particle diameter of 1.0 μm was used in place of lithium phosphate ($Li_3PO_4$) having an average particle diameter of 0.8 μm and that the proportion of lithium fluoride added was so set as to obtain an atomic ratio of Co:Li (exclusive of Li in $LiCoO_2$)=86:14 (M2/(M2+A)=0.14). The cylindrical cell thus obtained was evaluated in the same manner as in Example 1.

Upon observation of the powder obtained in Example 24 by SEM/EDX, it was confirmed that magnesium was uniformly distributed over the whole surfaces of particles of the lithium-transition metal compound oxide. Also, it was confirmed that lithium fluoride was present in the state of being deposited on the surfaces of the particles of the lithium-transition metal compound oxide or present between the particles.

Besides, the powder obtained in Example 24 was served to measurement of a powder X-ray diffraction pattern using CuKα, upon which a diffraction peak of lithium fluoride was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 25

A cylindrical cell was manufactured in the same manner as in Example 1, except that lithium fluoride (LiF) having an average particle diameter of 28 μm was used in place of lithium phosphate ($Li_3PO_4$) having an average particle diameter of 0.8 μm and that the proportion of lithium fluoride added was so set as to obtain an atomic ratio of Co:Li (exclusive of Li in $LiCoO_2$)=86:14 (M2/(M2+A)=0.14). The cylindrical cell thus obtained was evaluated in the same manner as in Example 1.

Upon observation of the powder obtained in Example 25 by SEM/EDX, it was confirmed that magnesium was uniformly distributed over the whole surfaces of particles of the lithium-transition metal compound oxide. Also, it was confirmed that lithium fluoride was present in the state of being deposited on the surfaces of the particles of the lithium-transition metal compound oxide or present between the particles.

Besides, the powder obtained in Example 25 was served to measurement of a powder X-ray diffraction pattern using CuKα, upon which a diffraction peak of lithium fluoride was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 26

A cylindrical cell was manufactured in the same manner as in Example 1, except that $LiNi_{0.5}CO_{0.2}Mn_{0.3}O_2$ having an average particle diameter of 11 μm was used in place of lithium cobaltate ($LiCoO_2$) having an average particle diameter of 13 μm. The cylindrical cell thus obtained was evaluated in the same manner as in Example 1.

Upon observation of the powder obtained in Example 26 by SEM/EDX, it was confirmed that magnesium was uniformly distributed over the whole surfaces of particles of the lithium-transition metal compound oxide. Also, it was confirmed that lithium phosphate was present in the state of being deposited on the surfaces of the particles of the lithium-transition metal compound oxide or present between the particles.

Besides, the powder obtained in Example 26 was served to measurement of a powder X-ray diffraction pattern using CuKα, upon which a diffraction peak of lithium phosphate was confirmed in addition to a diffraction peak corresponding to $LiNi_{0.5}CO_{0.2}Mn_{0.3}O_2$ having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 27

A cylindrical cell was manufactured in the same manner as in Example 1, except that lithium chloride (LiCl) having an average particle diameter of 1.1 μm was used in place of lithium phosphate ($Li_3PO_4$) having an average particle diameter of 0.8 μm and that the proportion of lithium chloride added was so set as to obtain an atomic ratio of Co:Li=98:2 (M2/(M2+A)=0.02). The cylindrical cell thus obtained was evaluated in the same manner as in Example 1.

Upon observation of the powder obtained in Example 27 by SEM/EDX, it was confirmed that magnesium was uniformly distributed over the whole surfaces of particles of the lithium-transition metal compound oxide. Also, it was confirmed that lithium chloride was present in the state of being deposited on the surfaces of the particles of the lithium-transition metal compound oxide or present between the particles.

Besides, the powder obtained in Example 27 was served to measurement of a powder X-ray diffraction pattern using CuKα, upon which a diffraction peak of lithium chloride was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 28

A cylindrical cell was manufactured in the same manner as in Example 1, except that aluminum chloride ($AlCl_3$) having an average particle diameter of 1.2 μm was used in place of lithium phosphate ($Li_3PO_4$) having an average particle diameter of 0.8 μm and that the proportion of aluminum chloride added was so set as to obtain an atomic ratio of Co:Al=98:2 (M2/(M2+A)=0.02). The cylindrical cell thus obtained was evaluated in the same manner as in Example 1.

Upon observation of the powder obtained in Example 28 by SEM/EDX, it was confirmed that magnesium was uniformly distributed over the whole surfaces of particles of the lithium-transition metal compound oxide. Also, it was confirmed that aluminum chloride was present in the state of being deposited on the surfaces of the particles of the lithium-transition metal compound oxide or present between the particles.

Besides, the powder obtained in Example 28 was served to measurement of a powder X-ray diffraction pattern using CuKα, upon which a diffraction peak of aluminum chloride was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 29

A cylindrical cell was manufactured in the same manner as in Example 1, except that zirconium chloride ($ZrCl_4$) having an average particle diameter of 1.1 μm was used in place of lithium phosphate ($Li_3PO_4$) having an average particle diameter of 0.8 μm and that the proportion of zirconium chloride added was so set as to obtain an atomic ratio of Co:Zr=98:2 (M2/(M2+A)=0.02). The cylindrical cell thus obtained was evaluated in the same manner as in Example 1.

Upon observation of the powder obtained in Example 29 by SEM/EDX, it was confirmed that magnesium was uniformly distributed over the whole surfaces of particles of the lithium-transition metal compound oxide. Also, it was confirmed that zirconium chloride was present in the state of being deposited on the surfaces of the particles of the lithium-transition metal compound oxide or present between the particles.

Besides, the powder obtained in Example 29 was served to measurement of a powder X-ray diffraction pattern using CuKα, upon which a diffraction peak of zirconium chloride was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Example 30

Manufacture of a cylindrical cell and evaluation of the cylindrical cell were conducted in the same manner as in Example 1, except that the upper limit of the charging voltage at the time of charging the cylindrical cell was set at 4.20 V.

Example 31

Manufacture of a cylindrical cell and evaluation of the cylindrical cell were conducted in the same manner as in Example 1, except that the upper limit of the charging voltage at the time of charging the cylindrical cell was set at 4.25 V.

Example 32

Manufacture of a cylindrical cell and evaluation of the cylindrical cell were conducted in the same manner as in Example 1, except that the upper limit of the charging voltage at the time of charging the cylindrical cell was set at 4.40 V.

Example 33

Manufacture of a cylindrical cell and evaluation of the cylindrical cell were conducted in the same manner as in Example 1, except that the upper limit of the charging voltage at the time of charging the cylindrical cell was set at 4.50 V.

Comparative Example 1

A cylindrical cell was manufactured in the same manner as in Example 1, except that magnesium carbonate was not added to lithium cobaltate. The cylindrical cell was evaluated in the same manner as in Example 1.

Comparative Example 2

A cylindrical cell was manufactured in the same manner as in Example 1, except that lithium cobaltate was admixed with magnesium carbonate in such quantities as to obtain an atomic ratio of Co:Mg=77:23 (M1/(M1+A)=0.23). The cylindrical cell was evaluated in the same manner as in Example 1.

Upon observation of the powder obtained in Comparative Example 2 by SEM/EDX, it was confirmed that magnesium was uniformly distributed over the whole surfaces of particles of the lithium-transition metal compound oxide. Also, like in Comparative Example 1, it was confirmed that lithium phosphate was present in the state of being deposited on the surfaces of the particles of the lithium-transition metal compound oxide or present between the particles.

Besides, the powder obtained in Comparative Example 2 was served to measurement of a powder X-ray diffraction pattern using CuKα, upon which a diffraction peak of lithium phosphate was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Comparative Example 3

A cylindrical cell was manufactured in the same manner as in Example 1, except that lithium phosphate was not added to the fired particles accompanied by magnesium deposited thereon. The cylindrical cell was evaluated in the same manner as in Example 1.

Comparative Example 4

A cylindrical cell was manufactured in the same manner as in Example 1, except that the proportion of lithium phosphate ($Li_3PO_4$) added was so set as to obtain an atomic ratio of Co:Li (exclusive of Li in $LiCoO_2$)=70:30 (M2/(M2+A)=0.3). The cylindrical cell was evaluated in the same manner as in Example 1.

Upon observation of the powder obtained in Comparative Example 4 by SEM/EDX, it was confirmed that magnesium was uniformly distributed over the whole surfaces of particles of the lithium-transition metal compound oxide. Also, it was confirmed that lithium phosphate was present in the state of being deposited on the surfaces of the particles of the lithium-transition metal compound oxide or present between the particles.

Besides, the powder obtained in Comparative Example 4 was served to measurement of a powder X-ray diffraction pattern using CuKα, upon which a diffraction peak of lithium phosphate was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Comparative Example 5

A cylindrical cell was manufactured in the same manner as in Example 1, except that lithium phosphate ($Li_3PO_4$) having an average particle diameter of 35 μm, obtained by changing the comminution condition for lithium phosphate ($Li_3PO_4$), was used in place of lithium phosphate ($Li_3PO_4$) having an average particle diameter of 0.8 μm. The cylindrical cell was evaluated in the same manner as in Example 1.

Upon observation of the powder obtained in Comparative Example 5 by SEM/EDX, it was confirmed that magnesium was uniformly distributed over the whole surfaces of particles of the lithium-transition metal compound oxide. Also, it was confirmed that lithium phosphate was present in the state of being deposited on the surfaces of the particles of the lithium-transition metal compound oxide or present between the particles.

Besides, the powder obtained in Comparative Example 5 was served to measurement of a powder X-ray diffraction pattern using CuKα, upon which a diffraction peak of lithium phosphate was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Comparative Example 6

A cylindrical cell was manufactured in the same manner as in Example 1, except that magnesium carbonate was not added to lithium cobaltate, that zirconium oxide ($ZrO_2$) having an average particle diameter of 0.7 μm was used in place of lithium phosphate ($Li_3PO_4$) having an average particle diameter of 0.8 μm and that the proportion of zirconium oxide added was so set as to obtain an atomic ratio of Co:Zr=98.5:1.5 (M2/(M2+A)=0.015). The cylindrical cell was evaluated in the same manner as in Example 1.

Upon observation of the powder obtained in Comparative Example 6 by SEM/EDX, it was confirmed, like in Example 1, that zirconium oxide was present in the state of being deposited on the surfaces of the particles of the lithium-transition metal compound oxide or present between the particles.

Besides, the powder obtained in Comparative Example 6 was served to measurement of a powder X-ray diffraction pattern using CuKα, upon which a diffraction peak of zirconium oxide was confirmed in addition to a diffraction peak corresponding to lithium cobaltate having a laminar rock salt structure.

Comparative Example 7

A cylindrical cell was manufactured in the same manner as in Example 1, except that zirconium oxide ($ZrO_2$) comminuted to have an average particle diameter of 0.7 μm was used in place of lithium phosphate ($Li_3PO_4$). The cylindrical cell was evaluated in the same manner as in Example 1.

Upon observation of the powder obtained in Comparative Example 7 by SEM/EDX, it was confirmed that magnesium was uniformly distributed over the whole surfaces of particles of the lithium-transition metal compound oxide. Also, it was confirmed that zirconium oxide was present in the state of being deposited on the surfaces of the particles of the lithium-transition metal compound oxide or present between the particles.

Besides, the powder obtained in Comparative Example 7 was served to measurement of a powder X-ray diffraction pattern using CuKα, upon which a diffraction peak of zirconium oxide was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Comparative Example 8

A cylindrical cell was manufactured in the same manner as in Example 1, except that zirconium oxide ($ZrO_2$) comminuted to have an average particle diameter of 28 μm was used in place of lithium phosphate ($Li_3PO_4$) and that the proportion of zirconium oxide ($ZrO_2$) added was so set as to obtain an atomic ratio of Co:Zr=98.5:1.5 (M2/(M2+A)=0.015). The cylindrical cell was evaluated in the same manner as in Example 1.

Upon observation of the powder obtained in Comparative Example 8 by SEM/EDX, it was confirmed that magnesium was uniformly distributed over the whole surfaces of particles of the lithium-transition metal compound oxide. Also, it was confirmed that zirconium oxide was present in the state of being deposited on the surfaces of the particles of the lithium-transition metal compound oxide or present between the particles.

Besides, the powder obtained in Comparative Example 8 was served to measurement of a powder X-ray diffraction pattern using CuKα, upon which a diffraction peak of zirconium oxide was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Comparative Example 9

A cylindrical cell was manufactured in the same manner as in Example 1, except that lithium fluoride (LiF) having an average particle diameter of 1.0 μm was used in place of lithium phosphate ($Li_3PO_4$) having an average particle diameter of 0.8 μm and that the proportion of lithium fluoride added was so set as to obtain an atomic ratio of Co:Li (exclusive of Li in LiCoO$_2$)=80:20 (M2/(M2+A)=0.2). The cylindrical cell was evaluated in the same manner as in Example 1.

Upon observation of the powder obtained in Comparative Example 9 by SEM/EDX, it was confirmed that magnesium was uniformly distributed over the whole surfaces of particles of the lithium-transition metal compound oxide. Also, it was confirmed that lithium fluoride was present in the state of being deposited on the surfaces of the particles of the lithium-transition metal compound oxide or present between the particles.

Besides, the powder obtained in Comparative Example 9 was served to measurement of a powder X-ray diffraction pattern using CuKα, upon which a diffraction peak of lithium fluoride was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Comparative Example 10

A cylindrical cell was manufactured in the same manner as in Example 1, except that lithium fluoride (LiF) having an average particle diameter of 45 μm was used in place of lithium phosphate (Li$_3$PO$_4$) having an average particle diameter of 0.8 μm and that the proportion of lithium fluoride added was so set as to obtain an atomic ratio of Co:Li (exclusive of Li in LiCoO$_2$)=80:20 (M2/(M2+A)=0.2). The cylindrical cell was evaluated in the same manner as in Example 1.

Upon observation of the powder obtained in Comparative Example 10 by SEM/EDX, it was confirmed that magnesium was uniformly distributed over the whole surfaces of particles of the lithium-transition metal compound oxide. Also, it was confirmed that lithium fluoride was present in the state of being deposited on the surfaces of the particles of the lithium-transition metal compound oxide or present between the particles.

Besides, the powder obtained in Comparative Example 10 was served to measurement of a powder X-ray diffraction pattern using CuKα, upon which a diffraction peak of lithium fluoride was confirmed in addition to a diffraction peak corresponding to lithium cobaltate having a laminar rock salt structure. In addition, a particle section was cut, and the distributions of elements in the radial direction were measured by Auger electron spectroscopy, upon which it was observed that the magnesium concentration was varying continuously from the surface to the inside of the particle.

Comparative Example 11

A cylindrical cell was manufactured in the same manner as in Example 1, except that LiNi$_{0.5}$CO$_{0.2}$Mn$_{0.3}$O$_2$ having an average particle diameter of 11 μm was used in place of lithium cobaltate (LiCoO$_2$) having an average particle diameter of 13 μm and that magnesium carbonate was not added. The cylindrical cell was evaluated in the same manner as in Example 1.

Upon observation of the powder obtained in Comparative Example 11 by SEM/EDX, it was confirmed that lithium phosphate was present in the state of being deposited on the surfaces of the particles of the lithium-transition metal compound oxide or present between the particles.

Besides, the powder obtained in Comparative Example 11 was served to measurement of a powder X-ray diffraction pattern using CuKα, upon which a diffraction peak of lithium phosphate was confirmed in addition to a diffraction peak corresponding to LiNi$_{0.5}$CO$_{0.2}$Mn$_{0.3}$O$_2$ having a laminar rock salt structure.

Comparative Example 12

A cylindrical cell was manufactured in the same manner as in Example 1, except that LiNi$_{0.5}$CO$_{0.2}$Mn$_{0.3}$O$_2$ having an average particle diameter of 11 μm was used in place of lithium cobaltate (LiCoO$_2$) having an average particle diameter of 13 μm and that lithium phosphate (Li$_3$PO$_4$) was not added. The cylindrical cell was evaluated in the same manner as in Example 1.

Upon observation of the powder obtained in Comparative Example 12 by SEM/EDX, it was confirmed that magnesium was uniformly distributed over the whole surfaces of particles of the lithium-transition metal compound oxide.

Besides, the powder obtained in Comparative Example 12 was served to measurement of a powder X-ray diffraction pattern using CuKα, upon which a diffraction peak corresponding to LiNi$_{0.5}$CO$_{0.2}$Mn$_{0.3}$O$_2$ having a laminar rock salt structure was observed. In addition, a particle section was cut, and the distributions of elements in the radial direction were measured by Auger electron spectroscopy, upon which it was observed that the magnesium concentration was varying continuously from the surface to the inside of the particle.

Comparative Example 13

Manufacture of a cylindrical cell and evaluation of the cylindrical cell were carried out in the same manner as in Example 1, except that magnesium carbonate was not added to lithium cobaltate and that the upper limit of the charging voltage at the time of charging the cylindrical cell was set at 4.20 V.

Comparative Example 14

Manufacture of a cylindrical cell and evaluation of the cylindrical cell were carried out in the same manner as in Example 1, except that magnesium carbonate was not added to lithium cobaltate and that the upper limit of the charging voltage at the time of charging the cylindrical cell was set at 4.25 V.

Comparative Example 15

Manufacture of a cylindrical cell and evaluation of the cylindrical cell were carried out in the same manner as in Example 1, except that magnesium carbonate was not added to lithium cobaltate and that the upper limit of the charging voltage at the time of charging the cylindrical cell was set at 4.40 V.

Comparative Example 16

Manufacture of a cylindrical cell and evaluation of the cylindrical cell were carried out in the same manner as in Example 1, except that magnesium carbonate was not added to lithium cobaltate and that the upper limit of the charging voltage at the time of charging the cylindrical cell was set at 4.50 V.

The evaluation results are shown in Tables 1 and 2 below.

TABLE 1

| | Positive electrode active material | | | | | | | Capacity |
| --- | --- | --- | --- | --- | --- | --- | --- | --- |
| | A | M1 | M1/(M1 + A) | M2 compound | Average particle diameter [μm] | M2/(M2 + A) | Charging voltage [V] | Initial capacity [Wh] | retention after 300 cycles [%] |
| Example 1 | Co | Mg | 0.01 | $Li_3PO_4$ | 0.8 | 0.02 | 4.35 | 9.1 | 82 |
| Example 2 | Co | Al | 0.01 | $Li_3PO_4$ | 0.8 | 0.02 | 4.35 | 8.9 | 84 |
| Example 3 | Co | Al | 0.01 | $Mg_2P_2O_7$ | 1.1 | 0.02 | 4.35 | 9.1 | 81 |
| Example 4 | Co | Mn | 0.01 | $Li_3PO_4$ | 0.8 | 0.02 | 4.35 | 8.8 | 80 |
| Example 5 | Co | Mg | 0.002 | $Li_3PO_4$ | 0.8 | 0.02 | 4.35 | 9.1 | 80 |
| Example 6 | Co | Mg | 0.16 | $Li_3PO_4$ | 0.8 | 0.02 | 4.35 | 8.8 | 84 |
| Example 7 | Co | Mg | 0.01 | $Li_2SO_4$ | 1.0 | 0.02 | 4.35 | 9.2 | 76 |
| Example 8 | Co | Mg | 0.01 | $Li_2PO_3F$ | 0.6 | 0.02 | 4.35 | 9.2 | 83 |
| Example 9 | Co | Mg | 0.01 | $Li_3PO_4$ | 0.8 | 0.002 | 4.35 | 9.0 | 81 |
| Example 10 | Co | Mg | 0.01 | $Li_3PO_4$ | 0.8 | 0.26 | 4.35 | 8.2 | 84 |
| Example 11 | Co | Mg | 0.01 | $Li_3PO_4$ | 10 | 0.02 | 4.35 | 9.1 | 80 |
| Example 12 | Co | Mg | 0.01 | $Li_3PO_4$ | 21 | 0.02 | 4.35 | 9.1 | 77 |
| Example 13 | Co | Mg | 0.01 | $ZrO_2$ | 0.7 | 0.015 | 4.35 | 9.0 | 81 |
| Example 14 | Co | Mg | 0.01 | $TiO_2$ | 0.6 | 0.015 | 4.35 | 8.9 | 80 |
| Example 15 | Co | Mg | 0.01 | ZnO | 0.9 | 0.015 | 4.35 | 9.1 | 76 |
| Example 16 | Co | Mg | 0.01 | $ZrO_2$ | 0.7 | 0.003 | 4.35 | 9.0 | 79 |
| Example 17 | Co | Mg | 0.01 | $ZrO_2$ | 0.7 | 0.13 | 4.35 | 8.3 | 77 |
| Example 18 | Co | Mg | 0.01 | $ZrO_2$ | 8.0 | 0.015 | 4.35 | 9.0 | 77 |
| Example 19 | Co | Mg | 0.01 | $ZrO_2$ | 17 | 0.015 | 4.35 | 9.0 | 75 |
| Example 20 | Co | Mg | 0.01 | LiF | 1.0 | 0.02 | 4.35 | 9.1 | 83 |
| Example 21 | Co | Mg | 0.01 | $AlF_3$ | 1.2 | 0.02 | 4.35 | 9.0 | 81 |
| Example 22 | Co | Mg | 0.01 | $YF_3$ | 1.1 | 0.02 | 4.35 | 8.9 | 79 |
| Example 23 | Co | Mg | 0.01 | LiF | 1.0 | 0.002 | 4.35 | 9.1 | 79 |
| Example 24 | Co | Mg | 0.01 | LiF | 1.0 | 0.14 | 4.35 | 8.1 | 74 |
| Example 25 | Co | Mg | 0.01 | LiF | 28 | 0.02 | 4.35 | 9.0 | 78 |

TABLE 2

| | Positive electrode active material | | | | | | | Capacity |
| --- | --- | --- | --- | --- | --- | --- | --- | --- |
| | A | M1 | M1/(M1 + A) | M2 compound | Average particle diameter [μm] | M2/(M2 + A) | Charging voltage [V] | Initial capacity [Wh] | retention after 300 cycles [%] |
| Example 26 | Ni, Co, Mn | Mg | 0.01 | $Li_3PO_4$ | 0.8 | 0.02 | 4.35 | 8.2 | 85 |
| Example 27 | Co | Mg | 0.01 | LiCl | 1.1 | 0.02 | 4.35 | 8.9 | 76 |
| Example 28 | Co | Mg | 0.01 | $AlCl_3$ | 1.2 | 0.02 | 4.35 | 8.8 | 77 |
| Example 29 | Co | Mg | 0.01 | $ZrCl_4$ | 1.1 | 0.02 | 4.35 | 9.0 | 74 |
| Example 30 | Co | Mg | 0.01 | $Li_3PO_4$ | 0.8 | 0.02 | 4.20 | 8.0 | 85 |
| Example 31 | Co | Mg | 0.01 | $Li_3PO_4$ | 0.8 | 0.02 | 4.25 | 8.4 | 84 |
| Example 32 | Co | Mg | 0.01 | $Li_3PO_4$ | 0.8 | 0.02 | 4.40 | 9.4 | 80 |
| Example 33 | Co | Mg | 0.01 | $Li_3PO_4$ | 0.8 | 0.02 | 4.50 | 10.0 | 68 |
| Comp. Ex. 1 | Co | — | — | $Li_3PO_4$ | 0.8 | 0.02 | 4.35 | 9.1 | 31 |
| Comp. Ex. 2 | Co | Mg | 0.23 | $Li_3PO_4$ | 0.8 | 0.02 | 4.35 | 6.3 | 71 |
| Comp. Ex. 3 | Co | Mg | 0.01 | — | — | — | 4.35 | 9.0 | 50 |
| Comp. Ex. 4 | Co | Mg | 0.01 | $Li_3PO_4$ | 0.8 | 0.3 | 4.35 | 7.8 | 61 |
| Comp. Ex. 5 | Co | Mg | 0.01 | $Li_3PO_4$ | 35 | 0.02 | 4.35 | 9.2 | 56 |
| Comp. Ex. 6 | Co | — | — | $ZrO_2$ | 0.7 | 0.015 | 4.35 | 9.0 | 48 |
| Comp. Ex. 7 | Co | Mg | 0.01 | $ZrO_2$ | 0.7 | 0.2 | 4.35 | 7.5 | 55 |
| Comp. Ex. 8 | Co | Mg | 0.01 | $ZrO_2$ | 28 | 0.015 | 4.35 | 9.0 | 38 |
| Comp. Ex. 9 | Co | Mg | 0.01 | LiF | 1.0 | 0.2 | 4.35 | 7.7 | 52 |
| Comp. Ex. 10 | Co | Mg | 0.01 | LiF | 45 | 0.02 | 4.35 | 8.5 | 41 |
| Comp. Ex. 11 | Ni, Co, Mn | — | — | $Li_3PO_4$ | 0.8 | 0.02 | 4.35 | 8.2 | 43 |
| Comp. Ex. 12 | Ni, Co, Mn | Mg | 0.01 | — | — | — | 4.35 | 8.0 | 53 |
| Comp. Ex. 13 | Co | — | — | $Li_3PO_4$ | 0.8 | 0.02 | 4.20 | 8.0 | 52 |
| Comp. Ex. 14 | Co | — | — | $Li_3PO_4$ | 0.8 | 0.02 | 4.25 | 8.3 | 40 |
| Comp. Ex. 15 | Co | — | — | $Li_3PO_4$ | 0.8 | 0.02 | 4.40 | 9.2 | 21 |
| Comp. Ex. 16 | Co | — | — | $Li_3PO_4$ | 0.8 | 0.02 | 4.50 | 9.9 | 4 |

As above-mentioned, with respect to the metallic element M1, the preferable range of the overall composition (with atomic ratio) of the compound oxide particles is as follows.

0.001<(metallic element M1)/((metallic element M1)+ (principal transition metal element A))<0.2

Besides, with respect to the metallic element M2 and the average particle diameter of the metallic element M2, the preferable ranges of the overall composition (with atomic ratio) of the compound oxide particles and the average particle diameter of the metallic element M2 are as follows.

Where the metallic element M2 is present in the form of a metallic salt:

0.001<(metallic element M2)/((metallic element M2)+ (principal transition metal element A))<0.3

Average particle diameter: not more than 25 μm

Where the metallic element M2 is present in the form of a metallic oxide:

0.002<(metallic element M2)/((metallic element M2)+ (principal transition metal element A))<0.15

Average particle diameter: not more than 20 μm

Where the metallic element M2 is present in the form of a metallic halide:

0.001<(metallic element M2)/((metallic element M2)+ (principal transition metal element A))<0.15

Average particle diameter: not more than 30 μm

As shown in Tables 1 and 2, in Examples in which the composition (with atomic ratio) of the compound oxide particles and the average particle diameter of the metallic element M2 are in the above-mentioned respective ranges, the initial capacity was not less than 8.0 Wh. Besides, in Examples 1 to 32 in which the charging voltage was not more than 4.40 V, the capacity retention after 300 cycles was not less than 74%. In Example 33 in which the charging voltage was as very high as 4.50 V, the capacity retention after 300 cycles was 68%.

In contrast, in Comparative Examples 1, 6, 11, 13, 14, 15 and 16 in which deposition of (coating with) the metallic element M1 was not conducted, the capacity retention was as low as 31%, 48%, 43%, 52%, 40%, 21% and 4%, respectively, though the initial capacity was sufficient.

In addition, while there was little difference in capacity retention between Example 30 in which the charging voltage was 4.20 V and Example 31 in which the charging voltage was 4.25 V, there was a large difference in capacity retention between Comparative Example 13 in which the charging voltage was 4.20 V and Comparative Example 14 in which the charging voltage was 4.25 V.

Similarly, while there was not a large lowering in capacity retention in Examples 32 and 33 in which the charging voltage was not less than 4.40 V, there was a large lowering in capacity retention in Comparative Examples 15 and 16 in which the charging voltage was not less than 4.40 V.

Particularly, in Comparative Example 16 in which the charging voltage was 4.50 V, the capacity retention was 4%, which means failure in playing a role of electric cell. In contrast, in Example 33, the presence of the metallic element M1 at the surfaces of the compound oxide particles led to a capacity retention of 68%, in spite of the high charging voltage of 4.50 V. Therefore, when the positive electrode active material according to an embodiment was used in a nonaqueous electrolyte cell with a high charging voltage, specifically, a charging voltage of not less than 4.25 V, a more conspicuous effect could be obtained.

In Comparative Examples 3 and 12 in which deposition of (coating with) the metallic element M2 was not conducted, the capacity retention was lowered, notwithstanding the initial capacity was sufficient.

In Comparative Example 2 in which the composition of the metallic element M1 was outside the preferable range and in Comparative Example 4 (metallic salt), Comparative Example 7 (metallic oxide) and Comparative Example 9 (metallic halide) in which the composition of the metallic element M2 was outside the preferable range, the initial capacity as well as the capacity retention was lowered.

In Comparative Example 5 (metallic salt), Comparative Example 8 (metallic oxide) and Comparative Example 10 (metallic halide) in which the average particle diameter of the metallic element M2 was outside the preferable range, the capacity retention was lowered, notwithstanding the initial capacity was sufficient.

In Examples 20 to 25 in which the compound of the metallic element M2 was a metallic halide and in Examples 27 to 29 in which the compound of the metallic element M2 was a metallic chloride, a high initial capacity and a high capacity retention could be obtained. Particularly, in the cases where a metallic halide was used as the compound of the metallic element M2, a better effect could be obtained.

Thus, where the compound oxide particles coated with the metallic element having a composition in the preferable range or an average particle diameter in the preferable range as above-mentioned are used as the positive electrode active material, both a high initial capacity and a high capacity retention could be obtained simultaneously.

While examples in which the positive electrode active material according to an embodiment was used for a cylindrical nonaqueous electrolyte secondary cell have been described in the above embodiment of the application, the application is not limited to the examples. The positive electrode active material according to an embodiment can be used also for cells of other shapes, such as angularly shaped cells, thin type cells, etc.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A positive electrode active material wherein at least one metallic element M1 different from a principal transition metal element A is present at least at part of a surface of a lithium-containing transition metal oxide particle containing the principal transition metal element A, and
   wherein a compound of a metallic element M2 different from the metallic element M1 is present in a coating manner or in the vicinity of the lithium-containing transition metal oxide particle, wherein the metallic element M1 is at least one selected from the group consisting of Mn, Fe, Mg, Al, Ni, and Co, wherein the metallic element M2 is at least one selected from the group consisting of Na, Li, Mg, Zr, Zn, Ba, Bi, Y, Ti, Al, and B, and wherein a concentration of the metallic element M1 varies continuously from the surface towards a center of the lithium-containing transition metal oxide particle such that the metallic element M1 has a continuous concentration gradient towards the center of the lithium-containing transition metal oxide particle, wherein the compound of the metallic element M2 is a metallic salt, wherein the metallic salt provides the positive electrode active material with an overall composition with atomic ratio of 0.001<(metallic element M2)/((metallic element M2)+(principal transition metal element A))<0.3, and has an average particle diameter of not more than 25 μm.

2. The positive electrode active material according to claim 1, having an overall composition with atomic ratio of 0.001< (metallic element M1)/((metallic element M1)+(principal transition metal element A))<0.2.

3. The positive electrode active material according to claim 1, wherein the compound of the metallic element M2 contains phosphorus.

4. The positive electrode active material according to claim 3, wherein the compound of the metallic element M2 is at least one metallic salt represented by the formula: $(M2)_xPO_yF_z$, where $0<x\leq 3$, $0<y\leq 4$, and $0\leq z\leq 6$.

5. The positive electrode active material according to claim 1, wherein a metallic halide is used as the compound of the metallic element M2, and provides the positive electrode active material with an overall composition with atomic ratio of 0.001<(metallic element M2)/(((metallic element M2)+(principal transition metal element A))<0.15, and wherein the metallic halide has an average particle diameter of not more than 30 μm.

6. The positive electrode active material according to claim 5, wherein the compound of the metallic element M2 is a metallic fluoride.

7. The positive electrode active material according to claim 1, wherein the lithium-containing transition metal oxide has a laminar rock salt structure.

8. The positive electrode active material according to claim 1, wherein the principal transition metal element A is at least one selected from the group consisting of Ni, Co, and Mn.

9. The positive electrode active material according to claim 1, wherein the metallic element M1 is uniformly distributed on the surface of the lithium containing transition metal oxide particle, and wherein the metallic element M2 is deposited on the surface of the lithium-containing transition metal oxide particle or is present between particles of the lithium-containing transition metal oxide.

10. The positive electrode active material according to claim 1, wherein the compound of the metallic element M2 does not contain the metallic element M1.

11. The positive electrode active material according to claim 1, wherein the metallic element M1 is diffused into an inside portion of the lithium-containing transition metal oxide particle.

12. A positive electrode comprising:
a positive electrode active material, wherein at least one metallic element M1 different from a principal transition metal element A is present at least at part of a surface of a lithium-containing transition metal oxide particle containing the principal transition metal element A, and
wherein a compound of a metallic element M2 different from the metallic element M1 is present in a coating manner or in the vicinity of the lithium-containing transition metal oxide particle, wherein the metallic element M1 is at least one selected from the group consisting of Mn, Fe, Mg, Al, Ni, and Co, wherein the metallic element M2 is at least one selected from the group consisting of Na, Li, Mg, Zr, Zn, Ba, Bi, Y, Ti, Al, and B, and wherein a concentration of the metallic element M1 varies continuously from the surface towards a center of the lithium-containing transition metal oxide particle such that the metallic element M1 has a continuous concentration gradient towards the center of the lithium-containing transition metal oxide particle, wherein the compound of the metallic element M2 is a metallic oxide,
wherein the metallic oxide provides the positive electrode active material with an overall composition with atomic ratio of 0.002<(metallic element M2)/((metallic element M2)+(principal transition metal element A))<0.15, and wherein the metallic oxide has an average particle diameter of not more than 20 μm.

13. The positive electrode according to claim 12, having an overall composition with atomic ratio of 0.001<(metallic element M1)/((metallic element M1)+(principal transition metal element A))<0.2.

14. A nonaqueous electrolyte cell comprising:
a positive electrode having a positive electrode current collector provided thereon with a positive electrode active material layer containing a positive electrode active material, a negative electrode, and an electrolyte solution,
wherein the positive electrode active material contains a material in which at least one metallic element M1 different from a principal transition metal element A is present at least at part of a surface of a lithium-containing transition metal oxide particle containing the principal transition metal element A, and
wherein a metallic element M2 different from the metallic element M1 is present in a coating manner or in the vicinity of the lithium-containing transition metal oxide particle, wherein the metallic element M1 is at least one selected from the group consisting of Mn, Fe, Mg, Al, Ni, and Co, wherein the metallic element M2 is at least one selected from the group consisting of Na, Li, Mg, Zr, Zn, Ba, Bi, Y, Ti, Al, and B, and wherein a concentration of the metallic element M1 varies continuously from the surface towards a center of the lithium-containing transition metal oxide particle such that the metallic element M1 has a continuous concentration gradient towards the center of the lithium-containing transition metal oxide particle, wherein the metallic element M2 is a metallic salt,
wherein the metallic salt provides the positive electrode active material with an overall composition with atomic ratio of 0.001<(metallic element M2)/((metallic element M2)+(principal transition metal element A))<0.3, and has an average particle diameter of not more than 25 μm.

15. The nonaqueous electrolyte cell according to claim 14, wherein the positive electrode active material has an overall composition with atomic ratio of 0.001<(metallic element M1)/((metallic element M1)+(principal transition metal element A))<0.2.

16. The nonaqueous electrolyte cell according to claim 15, wherein the lithium-containing transition metal oxide has a laminar rock salt structure, and an upper limit of charging voltage is in the range of from 4.25 to 4.50 V, and a lower limit of discharging voltage is in the range of from 2.00 to 3.30 V.

* * * * *